(12) United States Patent
Venable, Jr. et al.

(10) Patent No.: US 9,357,182 B2
(45) Date of Patent: *May 31, 2016

(54) RESILIENT REMOTE SURVEILLANCE SYSTEM AND METHOD

(71) Applicant: All Systems Designed Solutions, Inc., Kansas City, KS (US)

(72) Inventors: Gary E Venable, Jr., Kansas City, KS (US); Michael David Brown, Kansas City, KS (US)

(73) Assignee: All Systems Designed Solutions, Inc., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,218

(22) Filed: Sep. 17, 2015

(65) Prior Publication Data

US 2016/0014379 A1 Jan. 14, 2016

Related U.S. Application Data

(63) Continuation of application No. 13/784,385, filed on Mar. 4, 2013, now Pat. No. 9,143,743.

(51) Int. Cl.
*H04N 7/18* (2006.01)
*G08B 13/196* (2006.01)

(52) U.S. Cl.
CPC .............. *H04N 7/181* (2013.01); *G08B 13/196* (2013.01)

(58) Field of Classification Search
CPC .............................. G08B 13/196; H04N 7/181
See application file for complete search history.

(56) References Cited

U.S. PATENT DOCUMENTS

2010/0139290 A1* 6/2010 Leblond .................. F25B 21/02
62/3.3
2012/0113265 A1* 5/2012 Galvin .......................... 348/159

* cited by examiner

*Primary Examiner* — Dave Czekaj
*Assistant Examiner* — Nam Pham
(74) *Attorney, Agent, or Firm* — Shook, Hardy & Bacon L.L.P.

(57) ABSTRACT

A method, system, and medium are provided for remotely monitoring a surveillance area, including deploying a secure enclosure that includes a controller coupled to a switch, a router, and a video-server appliance, the controller configured to provide remote operation and status information presentable via a remote server coupled to the router, and sending video information received by one or more cameras.

19 Claims, 6 Drawing Sheets

RESILIENT REMOTE SURVEILLANCE SYSTEM AND METHOD

CROSS REFERENCE TO RELATED APPLICATIONS

This application is a continuation of, and claims the benefit of priority from, U.S. patent application Ser. No. 13/784,385, filed Mar. 4, 2013, entitled "RESILIENT REMOTE SURVEILLANCE SYSTEM AND METHOD" (to be U.S. Pat. No. 9,143,743), which is hereby expressly incorporated by reference in its entirety.

SUMMARY

A high-level overview of various aspects of certain embodiments of the invention is provided here for that reason: to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter. In brief and at a high level, this disclosure describes, among other things, ways to provide for the remote surveillance of one or more scenes, including providing a rugged apparatus that facilitates such surveillance despite being placed in a hostile or unbecoming environment.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of our technology may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
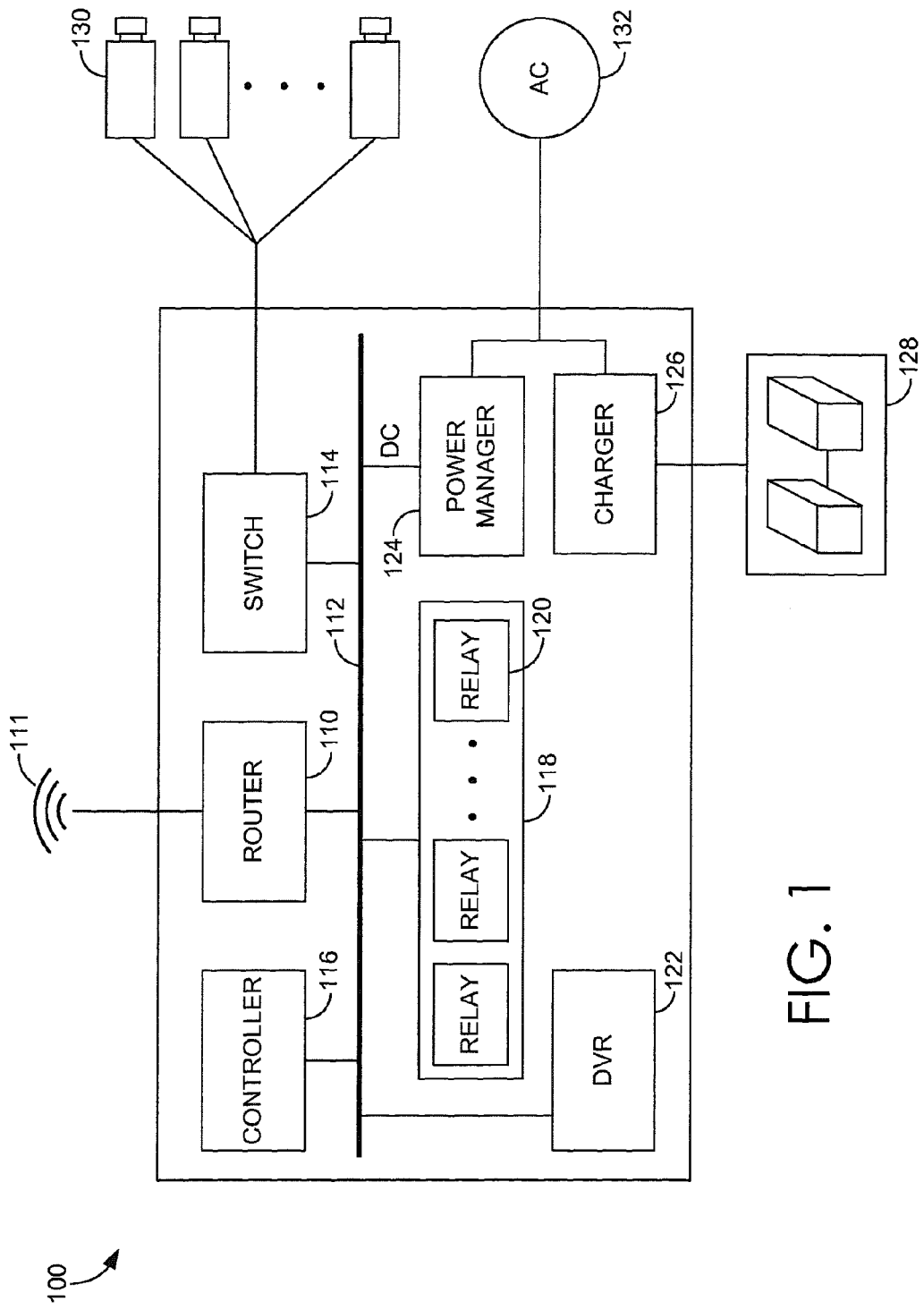
FIG. 1 depicts a logical diagram of an embodiment of aspects of a secure surveillance apparatus in accordance with an embodiment of the present invention.

Turning now to FIG. 1, an illustrative embodiment of aspects of the invention is provided and referenced generally by the numeral 100. This embodiment depicts a router 110 and one or more busses 112 that provide data or power connectivity to one or more of a switch 114, a controller 116, a relay block 118 that includes one or more relays 120, a video-server appliance 122, a power manger 124, and/or a charger 126. In one embodiment, charger 126 is coupled to one or more batteries 128. In one embodiment, individual fused power outputs are provided to each internal device.

An external power source 132 can be used to facilitate charging of batteries 128 by way of charger 126. One or more cameras 130 are also coupled to, for example, switch 114 (or to bus 112). In one embodiment, router 110 includes an ability to wirelessly transmit information. Various technologies can be used to wirelessly transmit information including, for example, cellular (3G, 4G, LTE, etc.), Wi-Fi, or any other wireless-transmission technology that can transmit the data described herein.

In operation, the aforementioned components (not necessarily all of them) can be used to provide a resilient remote surveillance apparatus. By way of example, cameras 130 can be positioned to observe a desired surveillance area. The information from cameras 130 is passed to switch 114. Switch 114 takes the form of a switch that can provide power over Ethernet (POE) such that the only cables between switch 114 and cameras 130 are Ethernet style cables. Switch 114 includes can receive video data from cameras 130 and pass them to router 110.

In FIG. 1, router 110 and switch 114 (along with various other components) are shown as separate components, but need not necessarily be. For purposes of this patent, certain components are individually shown so as to facilitate describing various functional aspects. But it is not intended that all of the components need to be individual components. Router 110 receives information from switch 114 and is can wirelessly transmit the information to a remote server (shown by reference numeral 111). Router 110 can also receive communications from a remote server and pass such communications or instructions to the various components depicted in FIG. 1.

Router 110 can include a modem (e.g., cellular and/or including LTE or WiMAX communicability options for example). In one embodiment, router 110 is assigned a static public IP address, easing the flow of inbound traffic. But router 110's address need not be static. The WAN ports can be disabled so that all (which is "both" in some embodiments) ports are LAN ports. Router 110 can be configured to reboot on a recurring basis, such as daily and include monitoring options for watch-dog failures and well as connection failures. It can also be configured to routinely ping a remote Internet address (such as that of a remote server). This pinging can help keep an Internet connection alive and be used to detect failures. Router 110 can also include an external high-gain cellular antenna and GPS antenna to increase its communications options and enhance functionality. A customized firewall is included and optimized for video viewing via the Internet.

By way of example, router 110 could receive an instruction that is processed by controller 116. Controller 116 includes the ability to interact with the various components depicted in FIG. 1 including the relays 120 of relay block 118 as well as router 110 and switch 114. Controller 116 is a component that can control aspects of certain devices such as router 110, switch 114, and video-server appliance 122. By way of example, controller 116 can be instructed to cycle the power of the various devices and to do so in a prescribed order. For example, controller 116 could receive an instruction by way of router 110 to reboot various components of FIG. 1 so that they come on line in a desired order. In one embodiment, reboot sequences can be carried out by way of GUI 310 of FIG. 3.

Controller 116, in one embodiment, takes the form of an input/output module. It can provide or interact with a web-based GUI 310, which allows for viewing status and providing remote control of input and output points. It can provide alerts (e.g., via email, text, voice, MMS, etc.) of components as well as custom responses to inputs with a desired output sequence. If appliance 122 fails, it can cycle power appropriately until server resumes. It can also provide, via e-mail, warnings of low battery and then performs a logical shutdown of the system.

If it were desired that each of switch 114, router 110, and video-server appliance 122 be shut down and restarted, then controller 116 could, by way of interacting with relay block 118, turn off switch 114, router 110, and video-server appliance 122. Controller 116 could also utilize relay block 118 to serially (if desired) turn back on the components in a desired order, for example, first router 110, then switch 114, and lastly video server appliance 122.

Server appliance 122 can take the form of a computer (e.g., a server). It can run a variety of operating systems, including a version of Linux. Appliance 122 is customized to provide for status and hard-drive LEDs to be mounted remotely. Normally, various status LEDs, including those or that of the hard drive, are locally observable by viewing a PC. In one embodiment of the invention, these LEDs can be monitored remotely by, for example, a server such as server 158. One way of accomplishing this is by mounting LEDs in the enclosure face and tying them into the system motherboard for status and HDD activity. This allows the status of the system to be assessed by all users including users that do not have access to the internals of the system.

Video appliance 122 is also customized to provide contact closure for failure status in one embodiment. This can be done by installing a relay on the motherboard USB bus and connecting this contact closure to I/O module 116 for notification and other sequences. This provides positive remote notification and status of the system as online and functional. This also provides for automatic alerts to be sent via e-mail, SMS, or software client of a failure of recording hardware. This output also can trigger I/O module 116 to enter a sequence of cycling power to the motherboard to return the system to normal operation. This feature provides redundancy and self-healing features to the system operation.

In one embodiment, video appliance 122 is configured to always be on when power is applied. This can be accomplished by removing all power switches from the appliance as well as modifying the motherboard BIOS and operating-system settings. This modification provides that if power is on, then the input to the motherboard system will be in an on state. A watchdog can also be put in place on the motherboard that will automatically reboot the system if processor activity is dormant for a period of time in a situation such as a lock up. This feature provides redundancy and self-healing features to system operation. One embodiment of appliance 122 employs a solid state storage drive.

In one embodiment, various components of FIG. 1 run on DC current instead of AC. By way of illustration, certain components run off of 12-volt DC current. In one embodiment, switch 114, router 110, controller 116, and video-server appliance 122, all run off of DC current instead of AC current. It is common for such devices to run off of AC current, but in one embodiment of the invention, components are natively run powered by direct current (DC). This enables them to be powered by batteries 128, which in one embodiment, are deep-cycle batteries. Thus, it is possible for all of the components in FIG. 1 to be powered in the complete absence of AC power 132. This contributes to the resilient nature of one embodiment of the invention in that apparatus 100 can be completely portable and operate in almost any geographic area. This also allows the system to be very efficiently powered and batteries recharged using solar and wind power generation (for example) utilizing those power sources native DC power outputs.

For example, a first geographic area might be a remote portion of a country in which there is unreliable (if any) power and no infrastructure for communicating data by way of a wire. Even in such an environment, the surveillance apparatus of FIG. 1 can be deployed to enable remote surveillance of a geographic area such that even if a continuous supply of power 132 were interrupted, batteries 128 would be able to power the components of FIG. 1 for an extended period of time. With that time being extended to a indefinite period of time with sufficient solar or wind sources available.

In one embodiment, charger 126 is used to recharge batteries 128 if they drop below a threshold level (or to maintain a desired level). In one embodiment, charger 126 includes an ability to provide on the order of 3 amps of current flow. This level of current flow would allow the system to charge and automatically maintain larger capacity batteries than if a smaller amperage were used.

Power manager 124 is configured to be ground isolated. Thus, when power manager 124 is affixed to a surrounding structure or casing (e.g., the enclosures of FIGS. 5A and 5B), it is ground isolated from such an enclosure, preventing any charge or current from flowing to the enclosure from power manager 124. Power manager 124 (in connection with charger 126 in one embodiment) is designed to be able to recharge large capacity deep-cycle batteries. As previously discussed, one way of designing charger 126 to be able to recharge large deep-cycle batteries is to increase the current flow as described.

Power manager 124 is also designed to cleanly disconnect power at set low voltages and reconnect only upon AC power restoration if desired. This is accomplished by an interlocking relay system, such as shown by way of relay block 118 composed of various relays 120. A relay disconnects the batteries from the system when both a continuous source of power 132 is interrupted and batteries 128 drop below a threshold voltage (such as 10 volts or some other desired low voltage). Once the relay is disconnected, it will only reconnect when AC power is restored in this embodiment. This power disconnection is in place so as to prevent system circuitry designed for voltages in a certain range (e.g., 14.5 to 10 volts) from being damaged from a low-voltage condition (sometimes referred to as a brown out). This technology can also prevent discharging the batteries to a point at which they might be damaged.

Our interlocking method (and restoring only on a restoration of a supplementary power source, such as an AC power source) prevents a ratcheting (rapid connecting and disconnecting) connection that could occur if reconnection was based solely on battery voltage. A ratcheting condition might otherwise occur when a battery 128 is disconnected upon reaching a certain low voltage; and the result of the disconnection unloads the battery, raising its surface charge above the disconnect level. This would result in a higher voltage, which could trigger reconnection, which would result in the battery being drained again below a desired level, which would result in disconnection, etc. This condition might otherwise repeat until a component fails in the system.

Figure 2:
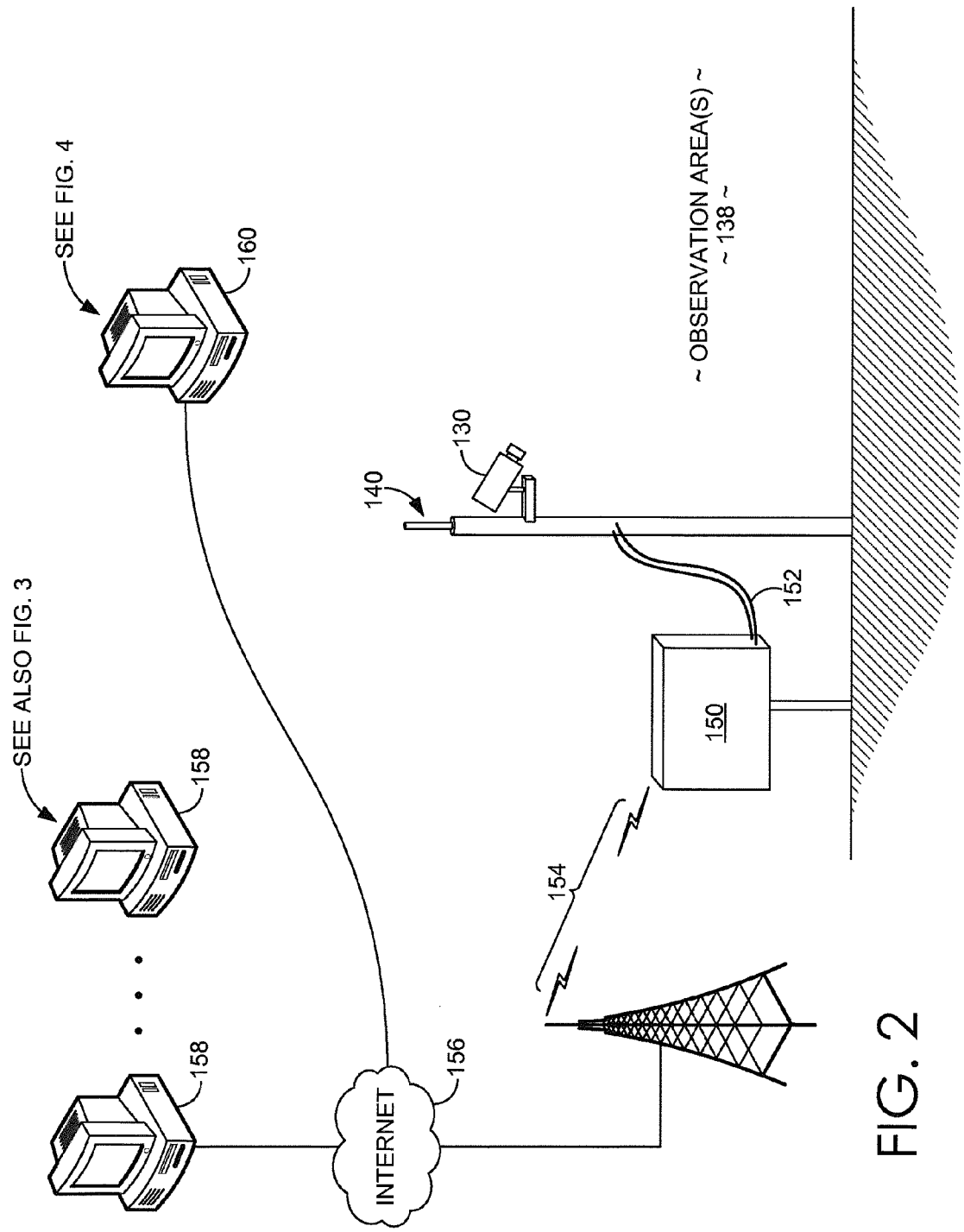
FIG. 2 depicts an exemplary operating environment suitable for practicing an embodiment of the present invention.
Figure 3:
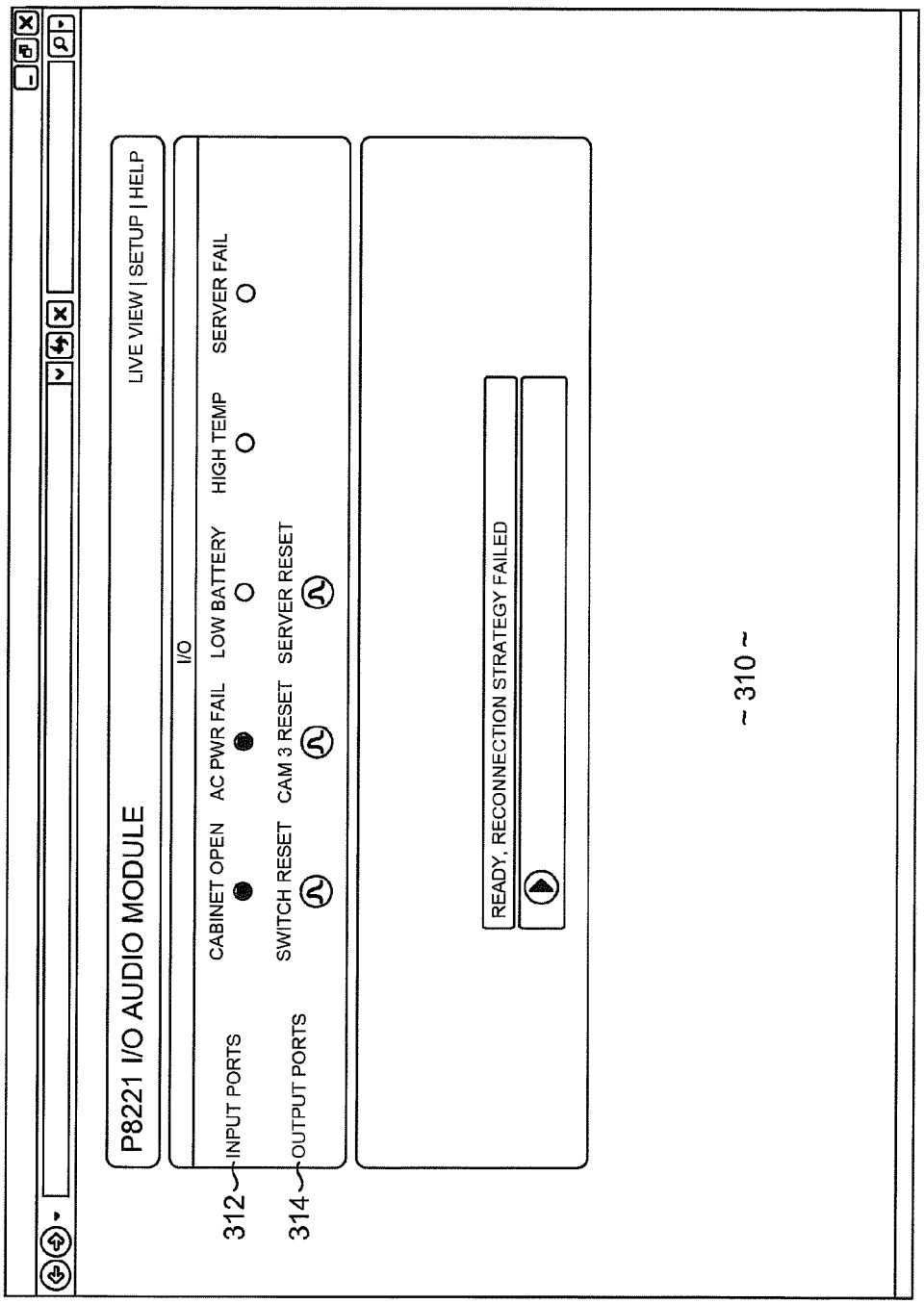
FIG. 3 depicts an exemplary user interface that facilitates, among other things, control and/or feedback of various options of the secure surveillance apparatus in accordance with an embodiment of the present invention.
Figure 4:
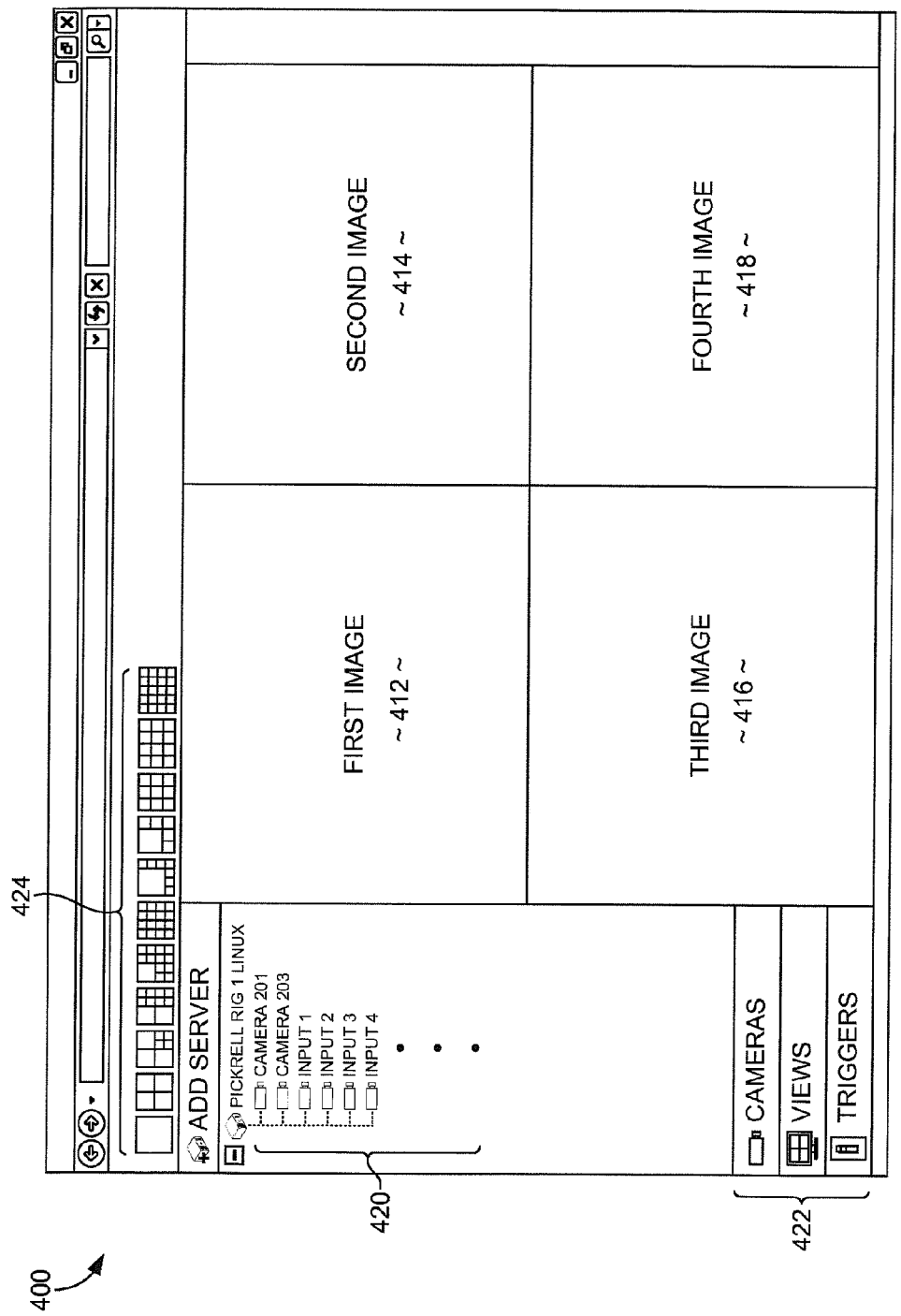
FIG. 4 depicts another exemplary user interface that facilitates, among other things, viewing of a remote scene in accordance with an embodiment of the present invention.

Turning now to FIG. 2, an exemplary operating environment for practicing an embodiment of the present invention is provided. The exemplary operating environment depicts camera 130 situated so as to be able to observe one or more observation areas. Camera 130 is coupled to security enclosure 150 by way of contacts housed within a contacts enclosure 152. Wire enclosure 152 can also connect antenna 140 to device 150. In one embodiment, device 150 includes the components of FIG. 1. As camera 130 observes observation area 138, video (and other) information can be communicated by way of wireless communications link 154. As previously mentioned, link 154 can be established by way of cellular or other RF communications that enable communication of wireless information according to the embodiment of the present invention. In one embodiment, the information is communicated by way of Internet 156 to one or more servers 158 (which will be described in greater detail with reference to FIG. 3). Wireless information from device 150 can also be communicated to the other servers such as server 160, which will be explained in greater detail with reference to FIG. 4. In one embodiment, the functionality associated with servers 158 and 160 is provided by way of a single server such that the functionality depicted by way of FIG. 3 and FIG. 4 is provided via the same server.

In some embodiments, observation area 138 is inhospitable and unbecoming such that cyclical surveillance systems are inappropriate and unable to communicate in the presence of various harsh conditions. Our first exemplary harsh condition is one that is remote and hot. For example, consider a drilling device, such as an oil rig, that is located in a rural, remote geographic area. In such an area, power may be sparse, if available at all; that is, AC power. Moreover, such an environment may be extremely dusty and hot. Still further, individuals who work in connection with such an environment might, in some situations, attempt to sabotage or pilfer the components of a remote-viewing apparatus. Our invention, however, is well suited to operate under such conditions. As will be explained in greater detail in connection with FIGS. 5A-7, the enclosure of device 150 can be hardened steel, include a variety of security mechanisms that prevent or detour access to the components within the system, and provide alerts when the system is tampered with.

As mentioned, providing power to device 150 can be difficult. If AC power is unavailable, batteries 128 can provide an ability for system 150 to operate for several days, several weeks, and more based on our design. Solar and wind generation can extend this time to an indefinite value. Our design employs the use of deep-cycle batteries, which can tolerate high drainage. Our design also, as previously mentioned, prevents a recycling of power by way of the interlocking system described above. The small form factor or footprint of device 150 also increases its attractiveness of use in harsh conditions. While some prior-art systems might consume an entire rack, our invention places all components within a single enclosure that is filtered by an unconventional filtering system that allows for the removal of particulate and dust in the harsh environment.

The source of applications suitable for our remote-surveillance apparatus are legion. Attempting to describe all of the various uses is a fruitless exercise. But, for example, other exemplary uses include monitoring development sites, job sites, removal operations, ocean projects, underground projects, etc. In one embodiment, video is stored locally in device 150 as well as transmitted by way of link 154.

With reference to FIG. 3 an exemplary user interface is provided that depicts options for viewing status and providing commands remotely to device 150. In one embodiment, user interface 310 is depicted on a remote server 158. That is, server 158 is remote from device 150. Remote can entail almost any span of remoteness, from a few miles to thousands of miles. Only a few exemplary options are depicted on FIG. 3. For example, input ports 312 provide an observer an indication as to whether the enclosure is open or closed. It can also indicate whether AC power has failed to device 150. Similarly, a low-battery indicator is provided as well as a high-temperature indicator and an indication as to whether server 122 has failed. Output ports 314 allow a user to reset a desired camera, reset a server, reset switch 114, etc. Again, controller 116 can provide a variety of other functions that enable remote control of the components of device 150.

FIG. 4 depicts an exemplary user interface for viewing a video information received by device 150 via cameras 130 in connection with observing an observation area 138. User interface 400 includes, for example, a depiction of first image 412, a second image 414, a third image 416, and a fourth image 418. Of course, other variations and additional images can be provided, as shown by way of reference numeral 424. A tree 420 of camera and input options is provided by the user interface to enable remote selection of a desired camera. There are also options 422 associated specifically with one or more cameras, views, or triggers.

Figure 5B:
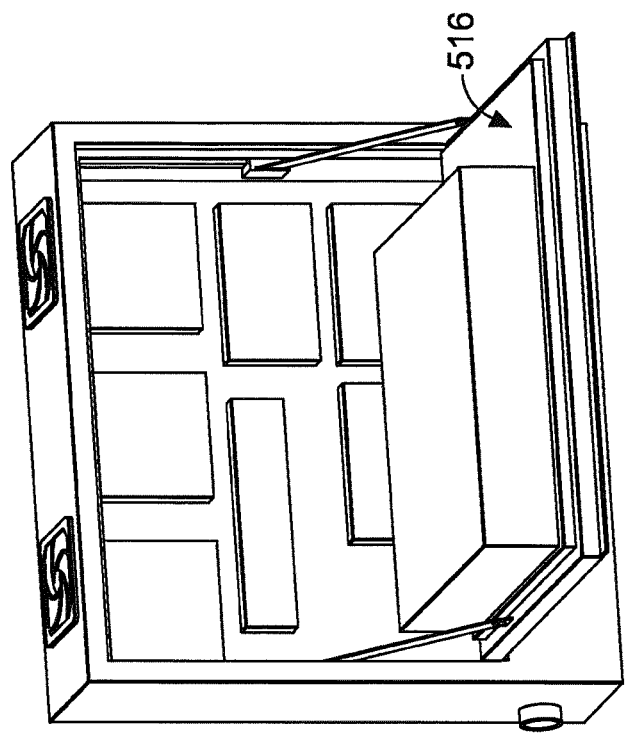
FIGS. 5A and 5B depict certain aspects of an exemplary enclosure of one embodiment of certain components of all or a portion of a surveillance apparatus in accordance with an embodiment of the present invention.
Figure 5A:
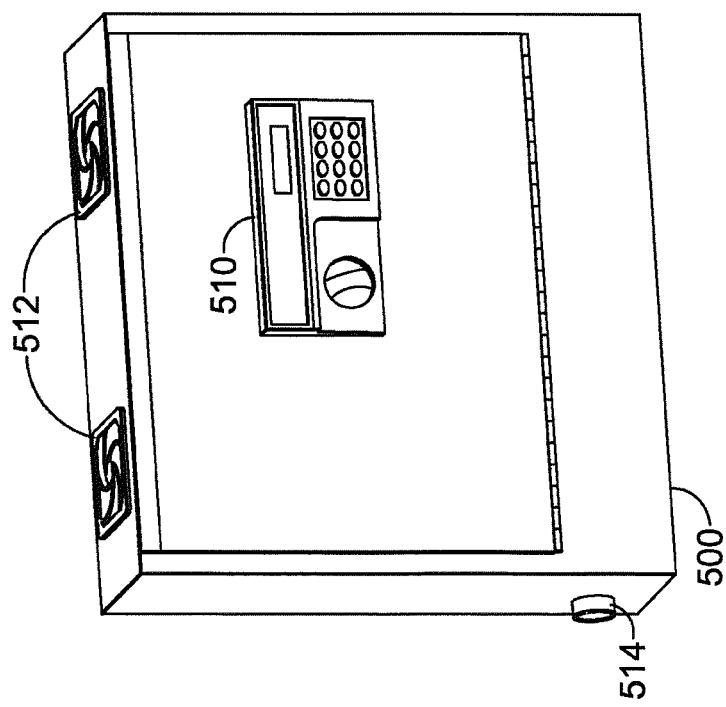

Turning now to FIG. 5A, an exemplary view of one embodiment of an enclosure of device 150 is provided and referenced generally by the numeral 500. As previously eluded to, enclosure 500 can be a recognized fully air sealed secure enclosure in one embodiment. Security options such as a keypad 510, keyed lock, or other security options can be employed to prevent or reduce tampering with the components within enclosure 500. Normally, the components of a device are to be easily accessible so as to provide maintenance and general observability. But in certain harsh environments, our invention provides a way to safely secure components while still enabling them to function. A port 514 is usable as the only air ingress port to receive air and force a filtering process. FIG. 5B depicts another view of enclosure 500, namely, one in which a retractable door 516 is shown in the open position. In this position, server 122 (not labeled) is shown attached to door 516. The other components are also depicted in FIG. 5B, but as previously mentioned, they can be actually enclosed within the enclosure of server 122. Two fans 512 are utilized to encourage a flow of air through port 514. Although computers normally have small, thin filters, we have devised a way to aggressively filter air in harsh environments to keep the interior of enclosure 500 clean from dirt (or any undesired contaminants such as bugs, etc.) for an extended period of time.

Figure 6:
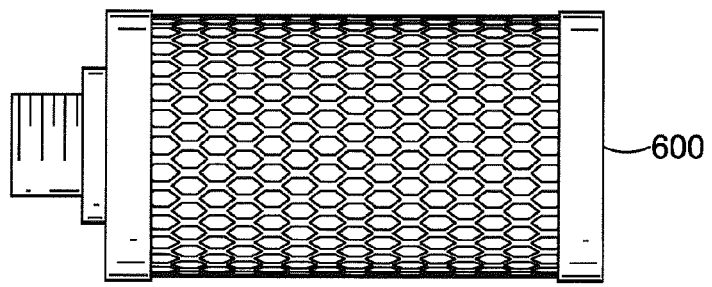
FIG. 6 depicts a first exemplary type of filter that may be used in connection with a filtering process in accordance with an embodiment of the present invention.
Figure 7:
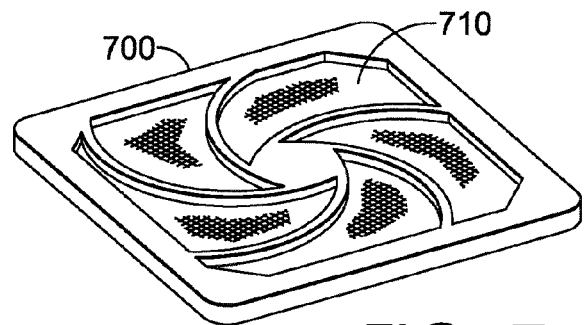
FIG. 7 depicts an egress webbing that may be used in connection with allowing air to escape in accordance with an embodiment of the present invention.
Figure 8:
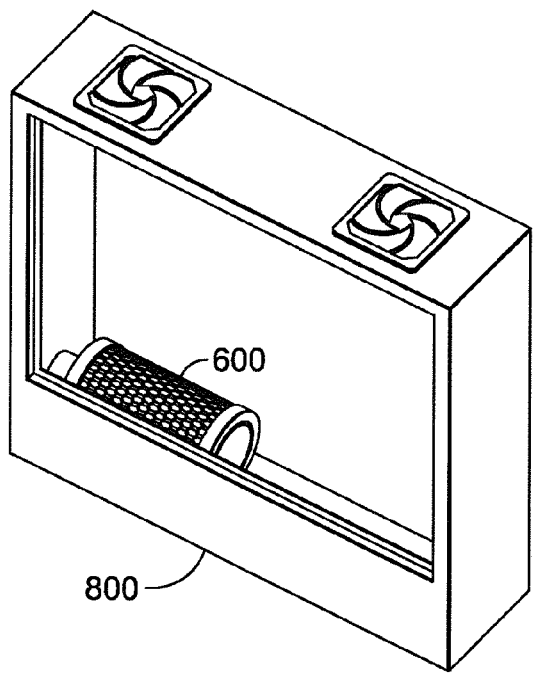
FIG. 8 depicts another view of aspects of an outer components enclosure in accordance with an embodiment of the present invention.

In one embodiment, the filter employed in connection with port 514 is show in FIG. 6 and referenced generally by the numeral 600. This sort of filter is not the normal sort of filter that one would employ to filter the contents of a computing apparatus. But small conventional computer filters are not equipped to provide the level of filtering both is size of particulates and in airflow that is desirable in certain environments such as a harsh, dusty environment. The filter of FIG. 6 can be on the order of 6" long and 3-4" in diameter it provides a filter element around the circumference of the cylinder that is folded repeatedly in a z style fold. This increases the surface area of the filter element to more than order of magnitude (e.g., beyond 20×) the area of a standard PC style filter. This additional surface area allows the filter element to have a tighter weave and trap much smaller particles and still maintain proper airflow levels for longer periods of time. A more conventional filter 700 is shown is FIG. 7. This prior-art filter 700 is thin and has only a small amount of webbing 710 that allows large particulates and provides a small filter surface area, this small surface area quickly clogs thus quickly reducing the airflow. Again, it 700 lacks the capability of sufficiently filtering air in harsh environments. But others have been dissuaded from relying on such a filter based on the belief that the single air-inlet port would not allow sufficient airflow to cool the system and otherwise allow it to work. One embodiment of our design uses an inlet port of such a diameter (relatively small) such that the rate of airflow is actually increased than if it were larger. This higher velocity air coupled with the aforementioned filter contributes to maintaining a sufficiently clean interior of the enclosure. FIG. 8 provides a depiction 800 of what filter 600 would look like placed in the enclosure of FIG. 5A.

We have described a variety of embodiments of our invention. For example, in one embodiment, a surveillance apparatus is provided. The surveillance apparatus provides a DC power source that provides power in the form of direct current. A network switch is included that receives surveillance information from one or more cameras and is powered by the DC power source. A router communicates data to and from a remote server and is also powered by the DC power source; a portion of the data includes imagery derived from the surveillance information. A video-server appliance stores at least a portion of the imagery and is also powered by the DC power source. A control facilitates presentation of status information on a remote graphical user interface by way of the remote server and is powered by the DC power source in one embodiment. The controller includes the capability to initiate a sequence whereby each of the switch, router, and server is brought to an online state in a desired order. This order can be done in accordance with a command sent from the remote from a remote server. Finally, an enclosure securely encloses the aforementioned components. The enclosure can have small form factor and in one embodiment is sealed except for discrete specific points that permit filtered air ingress and egress. Security can be provided by way of a lock, keypad, key, secure screws, fingerprint scanner, etc. (or combinations thereof).

Another embodiment of the invention provides a surveillance apparatus that includes a recognized enclosure that includes one or more security features for limiting access to a set of components within the enclosure. A cylindrical filter is coupled to an ingress port of the enclosure; it filters any air entering the enclosure. A controller is coupled to a switch, a router, and a video-server appliance within the enclosure. The controller is configured to provide remote operation and status information by way of a graphical user interface presentable by way of a remote server that is coupled to router via a wireless link. Each of the controller, switch, router, and video-server appliance is configured to be powered by a battery in one embodiment. This battery can be maintained and recharged by multiple types of power sources including AC power, solar power, wind generation, fuel cells, or generator, and the like.

A method for remotely monitoring the surveillance area is provided. One embodiment of the method includes deploying a recognized, secure enclosure that includes a controller coupled to a switch, a router, and a video-server appliance within the enclosure. The controller is configured to provide remote operation and status information by way of a graphical user interface and is presentable by way of a remote server that is coupled to the router via a wireless link. In one embodiment, the controller, switch, router, and video-server appliance are configured to be powered by a battery. By way of a communications path to a remote computing device, video information from one or more cameras coupled to the enclosure is sent to a remote receiving device. The method further includes periodically sending data through a wireless communications path even if no video information is sent through the wireless portion. An embodiment of the invention further includes determining that the battery has dropped below a first output threshold level, disconnecting power from one or more components within the enclosure, determining that the battery has risen above the first output threshold level to a seemingly safe output level, but until a presence of supplementary power is detected, avoiding reconnecting power to the one or more components even though a supposedly safe output level has been reached.

In one embodiment, the enclosure is on the order of 22×26×6 inches. In another embodiment, the guts of various components of FIG. 1 can be removed so that they can be inserted into a container, or even the enclosure of video-server appliance 122, reducing the aforementioned footprint by approximately half. In such an embodiment, the enclosure provides a place for a power unit, filtering the air, and providing security to the server. But a power unit (e.g., laptop style, or other) and server 122 would provide a functioning system. Also, a modular design can be employed so as to provide the option of modules such as an expansion unit that plugs in via a modular cable and expands the camera capability by 4, 8, etc. cameras.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A surveillance apparatus, comprising:
   a DC power source that provides power in the form of direct current;

a network switch that receives surveillance information from one or more cameras;

a router that communicates imagery derived from the surveillance information a remote server;

a video-server appliance that stores at least a portion of the imagery;

a controller that facilitates a presentation of status information on a remote graphical user interface ("GUI") via the remote server, the controller operable to initiate a sequence whereby each of the network switch, router, and video-server appliance is brought to an online state in a desired order; and an enclosure that securely encloses the network switch, router, video-server appliance, and controller, wherein the enclosure includes an ingress port to which a cylindrical filter within the enclosure can be coupled to filter an inflow of air into said enclosure.

2. The apparatus of claim 1, wherein the DC power source provides power at a voltage level from about 6 to 48 volts.

3. The apparatus of claim 2, wherein the DC power source provides power at a voltage level from about 11 to 15 volts.

4. The apparatus of claim 1, wherein the enclosure is characterized by the following dimensions:

a length and width of not more than approximately 21 inches; and a depth of not more than approximately 6 inches.

5. The apparatus of claim 1, wherein the enclosure is characterized by the following dimensions:

a length and width of not more than approximately 10 inches; and a depth of not more than approximately 4 inches.

6. The apparatus of claim 1, wherein the enclosure is characterized by the following dimensions:

a length and width of not more than approximately 15 inches; and a depth of not more than approximately 5 inches.

7. The apparatus of claim 1, wherein the DC power source is not conductively coupled to the enclosure.

8. The apparatus of claim 1, wherein the DC power source is ground isolated with respect to the enclosure.

9. The apparatus of claim 1 further compromising a supplementary power unit for persistently recharging one or more batteries.

10. The apparatus of claim 1, wherein the DC power source is configured to disconnect power based on a first low-voltage threshold and reconnect the power only upon the occurrence of one or more predetermined conditions.

11. The apparatus of claim 1, wherein the network switch is remotely bootable from the remote server.

12. The apparatus of claim 11, wherein the controller provides for an option on the GUI to reboot the network switch.

13. The apparatus of claim 2, wherein the router does not require the use of a a wide-area-network (WAN) port.

14. The apparatus of claim 2, wherein the router automatically communicates data through a wireless network path, thereby preserving access to the remote server.

15. A surveillance apparatus, comprising:

an enclosure that includes one or more security features for limiting access to a set of one or more components within the enclosure, wherein the enclosure includes an ingress port to which a cylindrical filter can be coupled to filter air entering the enclosure;

a controller coupled to a switch, a router, and a video-server appliance within the enclosure, the controller is configured to provide remote operation and status information by way of a graphical user interface presentable via a remote server coupled to the router, wherein each of the controller, switch, router, and video-server appliance is configured to be powered by a power source, and wherein the video-server appliance is configured to store imagery that can be presented remotely via a remote server that is coupled by one or more communication links to said surveillance apparatus.

16. The apparatus of claim 15, wherein the power source provides a source of DC voltage.

17. A method of remotely monitoring a surveillance area, the method comprising:

deploying a secure enclosure having an ingress port to which a cylindrical filter within the enclosure can be coupled to filter an inflow of air into said enclosure, wherein the secure enclosure includes a controller coupled to a switch, a router, and a video-server appliance within the enclosure, the controller configured to provide remote operation and status information to a remote server coupled to the router via a wireless link;

by way of a communications path to the remote server device, sending video information received by one or more cameras coupled to the enclosure; and periodically sending data through a wireless portion of the communications path even if no video information is sent through the wireless portion.

18. The method of claim 17, further comprising:

determining a battery powering at least one of the controller, the switch, the router, and the video-server appliance has dropped below a first output threshold level;

disconnecting power from one or more components;

determining that the battery has risen above the first output threshold level;

until a presence of supplementary power is detected, avoiding reconnecting power to the one or more components.

19. The method of claim 18, wherein the supplementary power is a source of AC or DC power.

* * * * *